United States Patent [19]

Trotel et al.

[11] 3,816,719

[45] June 11, 1974

[54] ELECTRONIC DEVICES FOR THE PROGRAMMED TRACING OF PATTERNS

[75] Inventors: Jacques Trotel; Robert Sigelle, both of Paris, France

[73] Assignee: Thomson-CSF, Paris, France

[22] Filed: June 19, 1973

[21] Appl. No.: 371,468

[30] Foreign Application Priority Data

June 23, 1972 France .......................... 72.22784

[52] U.S. Cl. .......................... 235/151, 340/324 A

[51] Int. Cl. .......................... G06f 3/14

[58] Field of Search .................... 235/151, 198, 197; 340/324 A, 172.5; 315/18, 24

[56] References Cited

UNITED STATES PATENTS

| | | | |
|---|---|---|---|
| 3,691,551 | 9/1972 | Kashio | 235/198 X |
| 3,696,391 | 10/1972 | Peronneau | 235/198 X |
| 3,716,705 | 2/1973 | Newell | 235/151 |
| 3,735,389 | 5/1973 | Tarczy-Hornoch | 235/198 |

*Primary Examiner*—Joseph F. Ruggiero
*Attorney, Agent, or Firm*—Cushman, Darby & Cushman

[57] ABSTRACT

A system is capable on the basis of data produced by a data processing machine of generating signals which can be applied to the horizontal and vertical deflection systems of an electronic device capable of producing predetermined traces. Each trace is broken down into elementary figures of three predetermined shapes, rectangle or parallelograms. The beam scans line-by-line, alternately from left to right and right to left, point by point, through each elementary figure, under the control of circuits supplied with the coordinates of a point in each figure, a number corresponding to the number of points to be scanned, the number of lines in each figure and a shape code.

7 Claims, 10 Drawing Figures

ELECTRONIC DEVICES FOR THE PROGRAMMED TRACING OF PATTERNS

The problem arises, in particular in the field of subminiaturised electronics systems, of transferring an area having a predetermined outline to a generally extremely small substrate. The figure may, for example, be designed for the manufacture of a mask for integrated circuits, by impression upon an appropriate resin.

Amongst the methods utilised hitherto, there is one which consists in decomposing the area which is to be reproduced, into a certain number of elementary areas or patterns each of which has a predetermined shape. A code corresponds with each elementary area.

The sequence of these codes is programmed in a data processing machine. The latter, by electromechanical means, acts for example upon an electron microscope or upon an oscilloscope comprising a diaphragm whose aperture is variable in width, height and position, and which produces the elementary area.

These electromechanical means are necessarily located outside the evacuated enclosure. This process is slow by reason of the presence of the electromechanical means and these devices are necessarily delicate and expensive.

The object of the present invention is a purely electronic device of this kind.

The invention is characterised essentially in that each elementary area is either a rectangle, the sides of which have fixed directions, or a parallelogram two sides of which are parallel to one and always the same or the two fixed directions, whilst the two others are parallel to one of the two directions located at 45° to said fixed direction, each elementary area thus being characterised by five parameters, namely the coordinates $x$ and $y$ of a given apex of the elementary area in relation to a rectangular system of coordinates, l the length of side of the figure parallel to said fixed direction, $h$ the height of the elementary figure, $c$ the code of the figure (rectangle or parallelogram of one or the other category). The sequence of these codes is programmed in a conventional data processing machine. The output of the latter operates a device which is the object proper, of the invention, and which produces control voltages acting upon an addressing device, for example an electron or photon beam. Each elementary area is obtained by a line-by-line scanning, the successive lines being scanned by the beam alternately in one direction or the other. Means are provided to contrive that each line is obtained by a regular succession of photon or electron impacts, each impact producing an image of small, predetermined dimensions, the consecutive images being contiguous with one another. In this fashion, a sequence of images which make up the elementary areas is obtained, this sequence taking the form of exposed areas having predetermined contours, the length $l$ of each elementary area being obtained by the number of points in each line and the heights h by the number of lines.

The invention will be better understood from a consideration of the ensuing description and the attached drawings in which.

Figure 3:
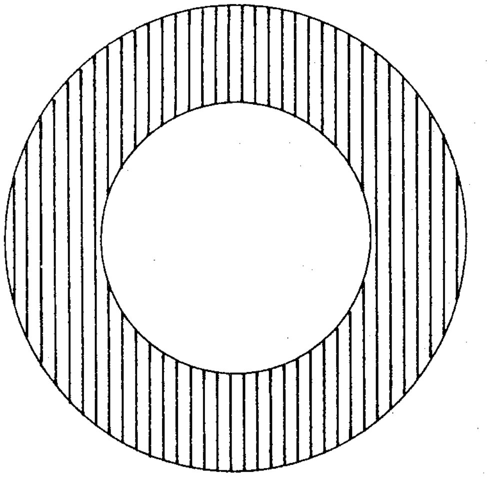
FIGS. 1 and 3 illustrate two arbitrary figures for printing upon an substrate, and their decomposition into elementary figures by the method in accordance with the invention.
Figure 1:
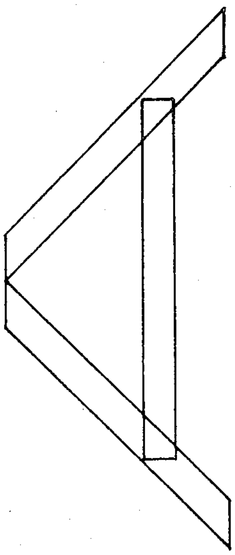

FIGS. 1 and 3 illustrate two patterns for reproduction upon a sensitive plate. In FIG. 1, a letter A has been illustrated the legs of which are inclined at 45° to the left and to the right in FIG. 3. It will be seen that in the letter A it is extremely easy to decompose it into parallelograms and rectangles of the form shown in FIG. 2, if we allow two elements to overlap. In FIG. 3, a ring has been illustrated which can be decomposed into rectangles of uniform height.

Figure 2:
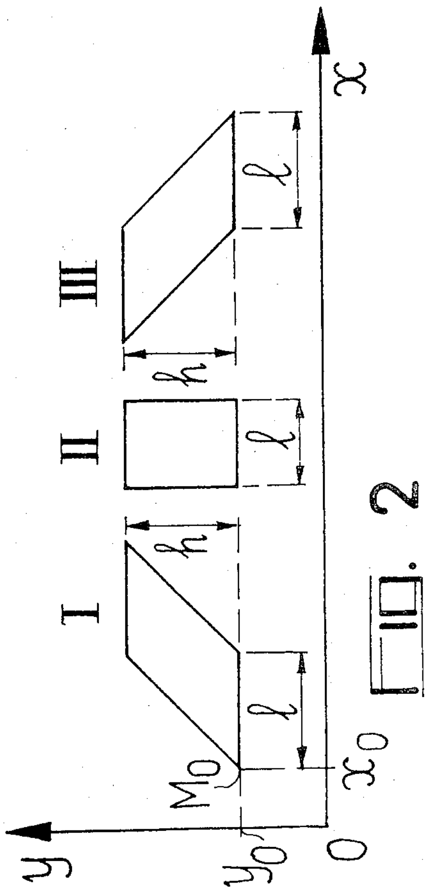
FIG. 2 illustrates the three forms of elementary areas and their corresponding parameters, which make it possible the entry into the peripheral equipment of a computer.

The elementary shapes shown in FIG. 2 are a parallogram, at I, two sides of which are parallel to the direction Ox and the two others inclined to the right at 45° to Ox, a rectangle, at II, with sides parallel to Ox and Oy, and a parallelogram, at III, two sides of which are parallel to Ox and two inclined to the left, likewise at 45°, in relation to Ox.

Each elementary area is thus characterised by five parameters (a); the coordinates $x_0$ and $y_0$ of one of its apices, for example the bottom lefthand apex Mo;

b. its width $l;$ c. its height $h;$ d. a parameter C of shape (shape I, II or III).

Figures 4, 5:
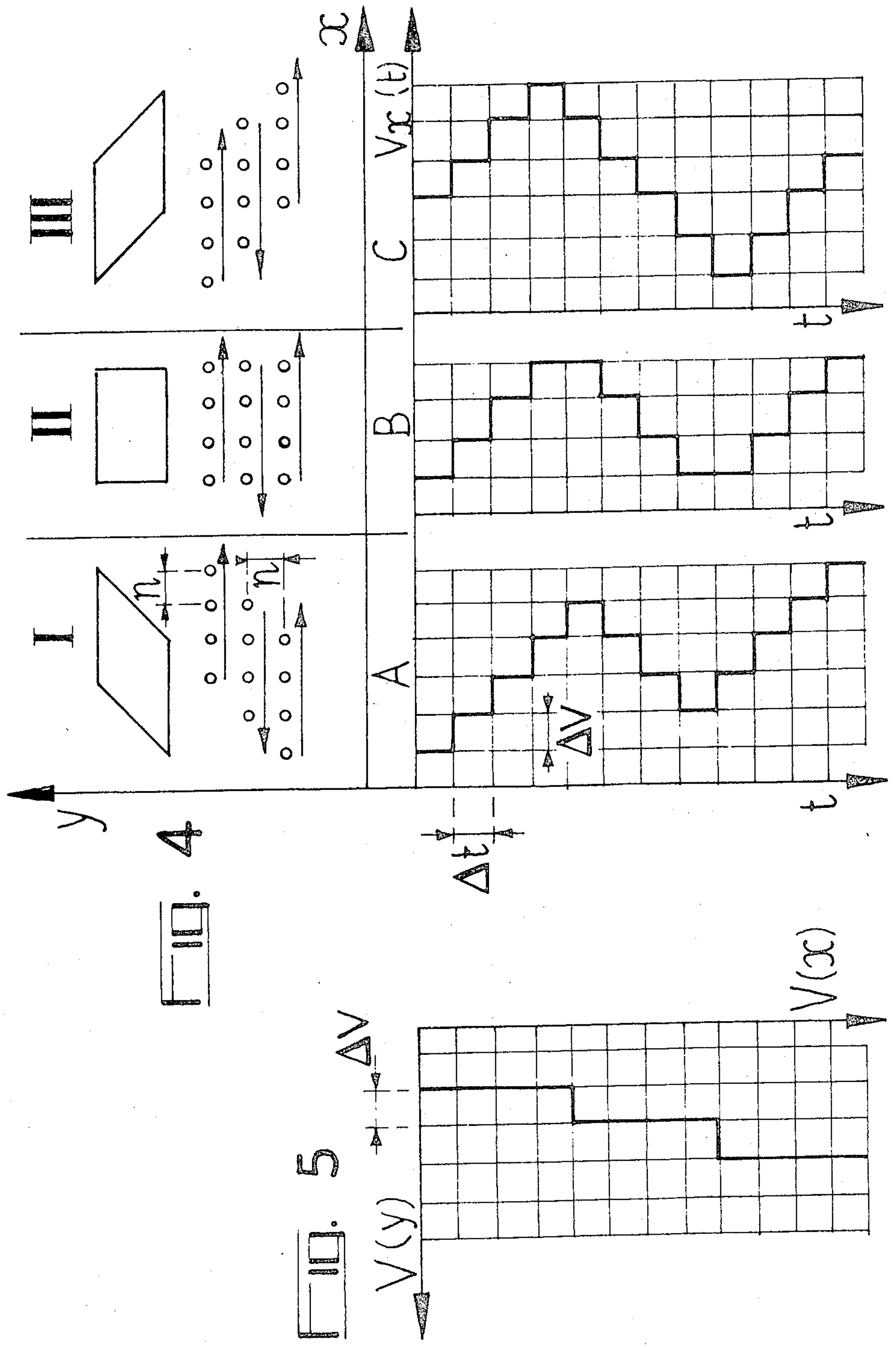
FIG. 4 illustrates the process of decomposition of these figures into elementary points and the process of impression of these elementary points upon a plate which is sensitive to particle bombardment.
FIG. 5 illustrates the voltages for application to a system producing deflection of the beam in two directions at right angles to one another, in order to reproduce these elementary points.

To obtain a predetermined figure, it is merely necessary to introduce the sequence of parameters $x_0$, $y_0$, $l$, $h$ and C of the various elementary figures making up the overall figure. The device which enables these figures to be transcribed onto the substrate which is to be impressed or printed, will now be described: In FIG. 4, three elementary figures of the shapes I, II and III can be seen which have the same height h and same dimension l. These figures are produced by the impression of successive points all spaced from each other by the same distance $n$. The lines of points are likewise spaced apart by the same distance $n$, the latter being substantially equal to the diameter of each point. To clarify the figure, the diameter has been made sufficiently small to enable each point to be differentiated from the others. In reality, each of the Figures is traced in the form of a surface.

In the example described, the lines of successive points and the successive points of one and the same line, are spaced apart by the same distance. In the following, it should be understood that we are concerned with the centres of the exposed (illuminated) points, where diameters, in an industrial application, in the order of 0.1 micron.

To print or impress these points, in accordance with the invention a line-by-line scanning will be used, the lines being scanned alternately in one direction or the other as shown in the Figure. To carry out this line-by-line scanning, it is merely necessary to apply step voltages to the horizontal deflection system, in the manner shown in FIG. 4. In the three cases, there are four points for each line and there are three lines for each area.

To successively impress the points of the same elementary image, the invention provides the following method. two voltages V(xo) and V(yo) are applied, at the start of the scanning of each elementary area, respectively to the horizontal and vertical deflection systems of the particle beam generating device, for example, an electron beam generating device. These voltages are functions of the coordinates *xo* and *yo* of the point Mo which is the first point at the left of the first line.

Whatever the elementary figures, the voltage V(y) (FIG. 5) varies in the same way. During a time of 4 $\Delta t$, ($\Delta t$) will be defined hereinafter, the voltage V(y) remains constant (time taken to scan the first line). At the end of this time, it will take the value $Vo(y) + \Delta V$ and will retain this value for the time 4 $\Delta t$ (2nd line), whereafter it will take the value $Vo(y) + 2\Delta V$.

The scanning of the first line takes place from left to right. The second line is scanned from right to left, and so on. The initial voltage V(*xo*) is a function of the abscissae position of the point Mo. This voltage remains constant for the time $\Delta t$, this being the time taken for the electron beam to impress or print the resin.

At the end of the time $\Delta t$ and during another period of time $\Delta t$, the voltage becomes $V(xo) + \Delta V$, and it remains constant for a new period of time $\Delta t$ (time taken to impress the second point), after which, in the same fashion, it successively becomes $V(xo) + 2\ \Delta V$, $V(xo) + 3\ \Delta V$. The four points in the first line are thus impressed after the elapse of the time 4 $\Delta t$.

The voltage $V(y)$ then being equal to $V(yo) + \Delta V$, the second line is then scanned in the same fashion from right to left.

In the case of the shape I, to produce the first point in the second line, it is necessary to add $\Delta V$ to the voltage $Vx(t)$ obtained at the end of the scanning of the first line and to decrease step by step the voltage $Vx(t)$ from $V(xo) + 4\ \Delta\ V$ to $V_{xo} +\ V$, and thus obtain the point of the second line, whereafter, when $Vy$ changes from $V_{yo} + \Delta V$ to $V_{yo} + 2\ \Delta V$, $V_x$ must increase from $V_{x_0} + 2\ \Delta V$ to $V_{x_0} + 5\ \Delta V$. (*Curve A*).

In the case of the shape II, the voltage $V_x$ for scanning the three lines will be as follows: In the case of the first line:

$$V_{xo}$$
$$V_{xo} + \Delta V$$
$$V_{xo} + 2\Delta V$$
$$V_{xo} + 3\Delta V \text{ (Curve B).}$$

In the case of the second line:

$$V_{xo} + 3\ \Delta V$$
$$V_{xo} + 2\ \Delta V$$
$$V_{xo} + \Delta V$$
$$V_{xo}$$

In the case of the third line:

$$V_{xo}$$
$$V_{xo} + \Delta V$$
$$V_{xo} + 2\ \Delta V$$
$$V_{xo} + 3\ \Delta V$$

In the case of the shape III, taking the first line the sequence will be:

$$V_{xo}$$
$$V_{xo} + \Delta V$$
$$V_{xo} + 2\ \Delta V$$
$$V_{xo} + 3\ \Delta V$$

the second line:

$$V_{xo} + 2\ \Delta V$$
$$V_{xo} + \Delta V$$
$$V_{xo}$$
$$V_{xo} - \Delta V$$

The third line:

$$V_{xo} - 3\ \Delta V$$
$$V_{xo} - \Delta V$$
$$V_{xo}$$
$$V_{xo} + \Delta V \text{ (Curve C).}$$

The following figures schematically illustrate devices which are capable of generating electrical signals from the output of the data processing system which has successively recorded the sequences of *xo*, *yo*, *l*, *h* and the shape parameter C.

We will now successively consider the devices which can be used to generate the voltages $V_x$ and $V_y$ of the type described.

Figure 6:
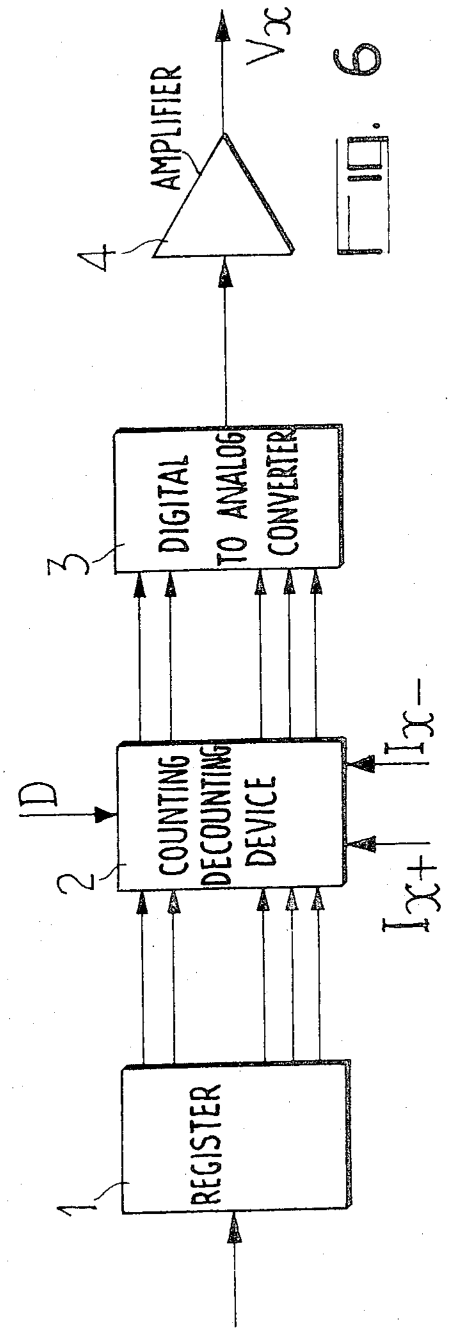
FIGS. 6 and 7 illustrate block diagrams of parts of the device in accordance with the invention.

The device shown in FIG. 6 comprises a first register 1 connected to the computer and comprising *n* outputs; the state, 0 or 1, of these outputs, represents a number with n digits, in the binary code, which is the number *xo*.

The register feeds its content into a forward and backward counter 2 with three inputs, namely an input D connected to a further output of the data processing system, a forward-counting input $Ix_+$ and a backward-counting input $I_{x-}$. These two inputs receive pulses at a constant pulse rate from a device which will be described hereinafter. The outputs of of this forward and backward counter are connected to a digital-analogue converter 3 whose output is connected to an amplifier 4 producing the scanning voltage Vx.

The operation of the system is as follows:

At a time *to*, determined by the data processing system, the forward and backward counter 2 starts and at this instant its count indicates a number *xo* which is the abscissae position which is the point Mo in the elementary figure being executed, at the time *to*. The input D controls this start-up.

At this instant, the forward and backward counter is supplied at its input $Ix_+$ with pulses which increase its count. In other words if the count at the time to is *xo*, with each pulse $Ix_+$ which it receives its count will increase by one unit.

Similarly, with each pulse which it receives at its input $Ix_-$, its count will decrease by one unit.

From the device to be described hereinafter, it receives a series of pulses $Ix_+$ and then a series of pulses $Ix_-$.

The digital-analogue converter 3 supplies to the amplifier 4, at the time to, a voltage equal to $x_o u$, $u$ being the voltage corresponding to $xo = 1$, if a pulse $Ix_+$ is transmitted, the voltage produced is $(x_o + 1)u$.

If a pulse $Ix_-$ is transmitted, the voltage produced is $(x_o - 1)u$.

Figure 7:
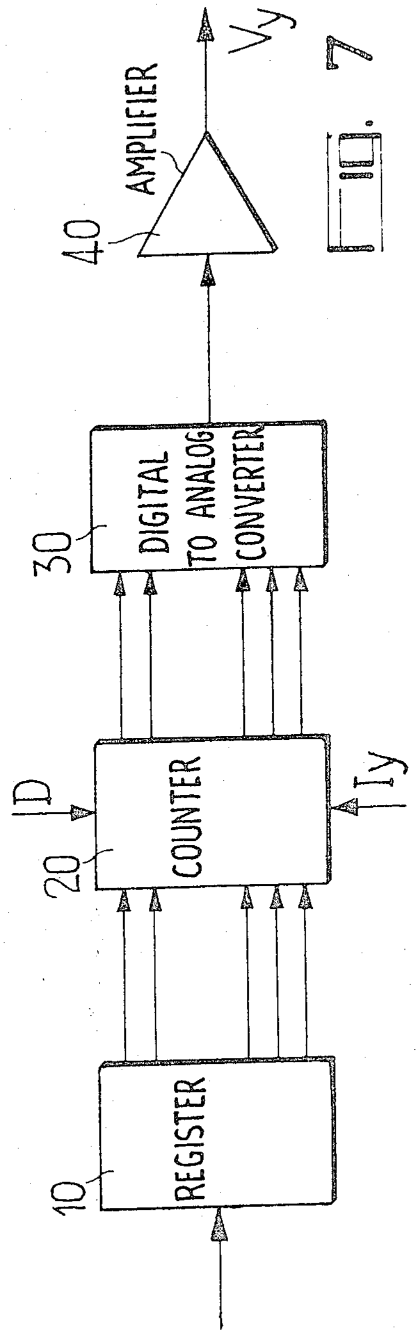

In the same fashion, FIG. 7 illustrates the device utilised to generate the voltages $V_y$. It comprises elements 10, 20, 30, 40 identical to those 1, 2, 4, 4 of the preceding figure with the exception of the fact that the counter 20 has no backward counting input, instead simply a forward counting input Iy. Its operation is otherwise identical.

The result is that the voltage Vx is a step voltage exhibiting rising or descending steps, whilst the voltage Vy is a step voltage which always exhibits rising steps.

Figure 8:
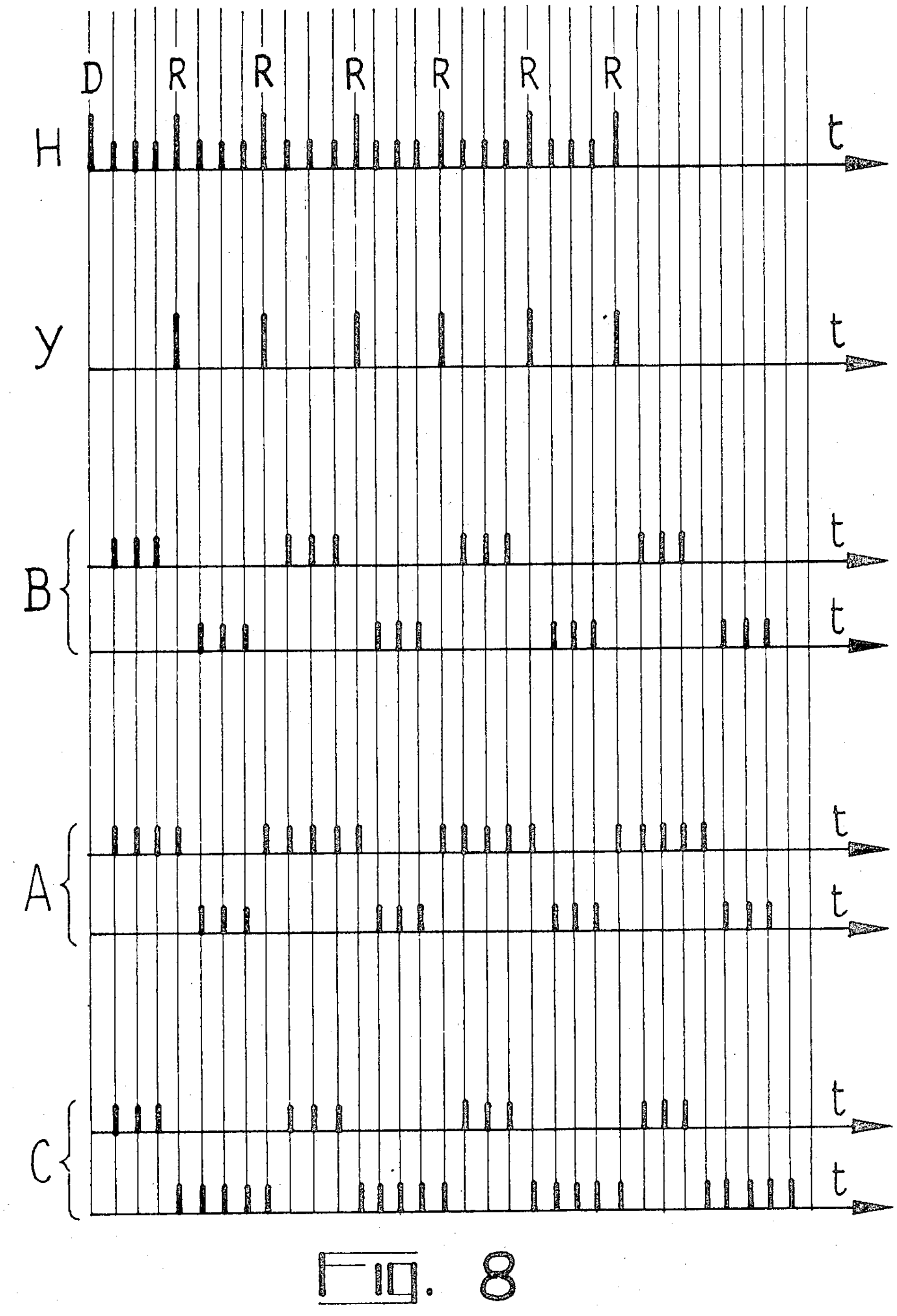
FIG. 8 is an assembly of explanatory diagrams.

FIG. 8 illustrates the voltage pulses required to produce the step voltages of FIGS. 5 and 4.

The curve H illustrates the clock pulses from the time $t_o$ onwards. The first pulse marked D, defines the beginning of the process of printing of the elementary figure. This pulse is followed by a sequence of three pulses which correspond to the four points of the first line, and by a pulse marked R corresponding to the passage from one line to the next and, for the sake of clarity shown as having an amplitude higher than the others. There then follow the three pulses of the second line, the pulse R indicating transit to the third line, and the pulses of the third line itself.

The pulses R are in reality pulses applied to the input Iy. They are indicated in the curve marked Y.

The curves marked A, B and C represent the distribution of the pulses $Ix_+$ and $Ix_-$ for application to the inputs of the forward and backward counter 2 of FIG. 6 for the cases A, B and C.

From a comparison with the curve shown in FIG. 5 and marked B, it can be seen that there are three pulses $Ix_+$, each corresponding to an increment $\Delta V$, the maximum for a line being $3\ \Delta V$, for the stepped rise of the first line, and three pulses Ix for the stepped descent in the second line, and that each sequence of line pulses is separated from the next by an interval equal to twice $\Delta t$ ($\Delta t$ being of course the normal duration of the horizontal part of the step function). In other words, as FIG. 5B shows, the last point in the first line has the same abscissae position as the first point to the first point scanned in the second line, as explained hereinbefore.

Thus, there are sequences of three pulses $Lx_+$ ($n-1$ in the general case) for the rise and three pulses $Ix_-(n-1)$ for the descent, separated by a pulse pause in the case of the rectangular shape or shape II.

In the case of the shape I, (curve A), starting from the pulse D, in the same way, there will be four pulses $Ix_+$ (not counting the pulse D) $n$ for the first line, followed by three pulses ($n-1$) for the descent, commencing from the starting pulse, followed by five pulses for the rise ($n+1$). There will be no break between each sequence of pulses $Ix_+$ and $Ix_-$. Thus, generally speaking, there will be ($n+1$) pulses $Ix_+$, followed by ($n-1$) pulses $Ix_-$, with no dead time between lines.

In the case of the shape III, curve C, commencing from the beginning, there will be three pulses (or $n-1$) $Ix_+$, followed by five pulses $Ix_-$, with no break between the sequences.

The result is that the device for forming the pulses $Ix_+$ and $Ix_-$ must be supplied by the computer, with:

A. the coordinates $xo$ and $yo$ (that is to say the starting command) produced by the data processing register;

B. lengths l and h, that is to say the number of points in each line, and the number of lines;

C. an indication of the shape of the elementary figure to be traced. This indication will be manifested by an indication to the effect that either two supplementary pulses are to be added to the sequences $Ix_+$ (case of shape I), or no such pulses are to be added at all and a break left between the pulses $Ix_+$ and $Ix_-$ (case of the shape II), or two supplementary pulses are to be added to the sequence of pulses $Ix_-$ (case of the shape III).

Figure 9:
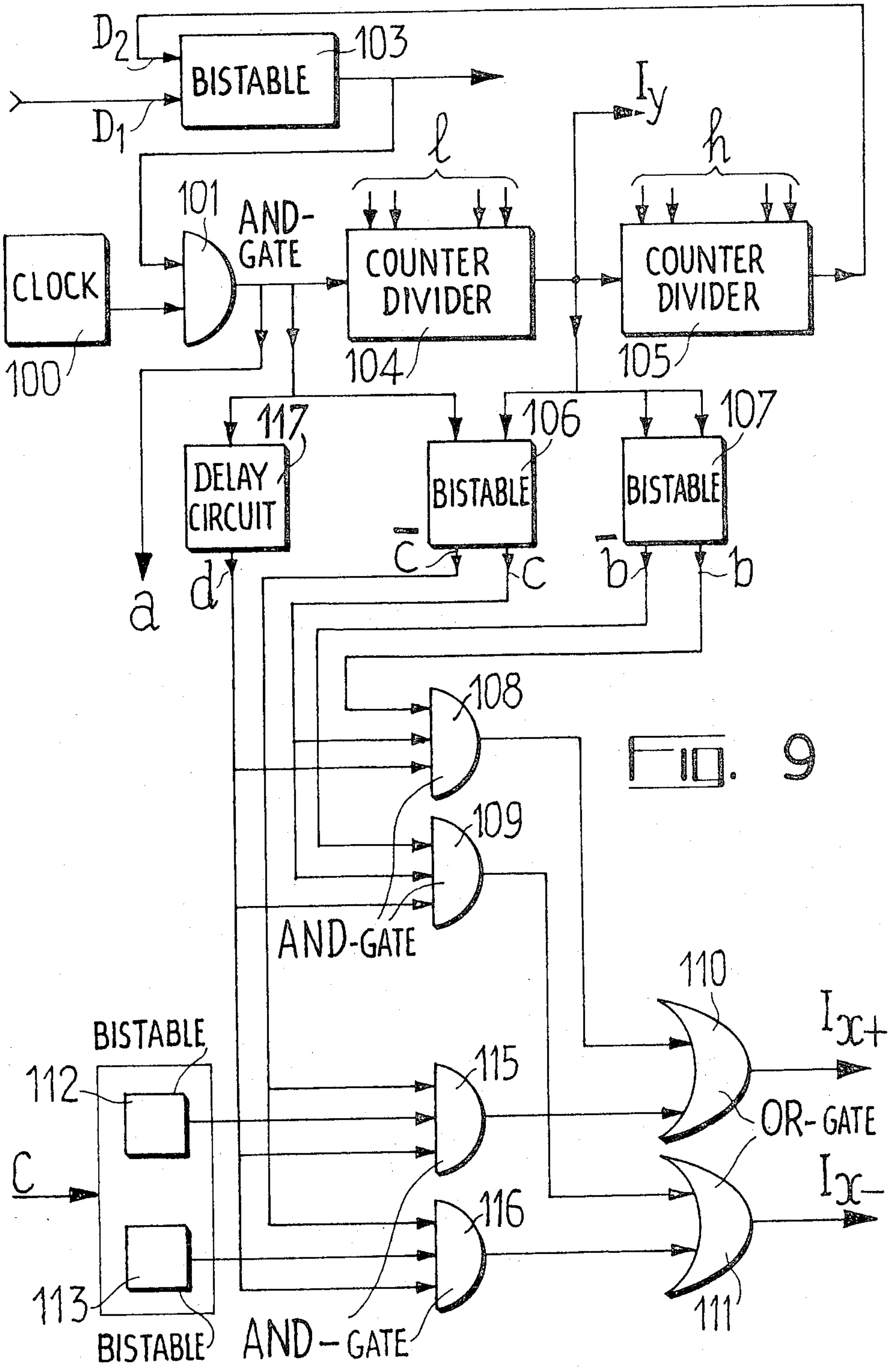
FIG. 9 is an example of the block diagram of another part of the device in accordance with the invention.
Figure 10:
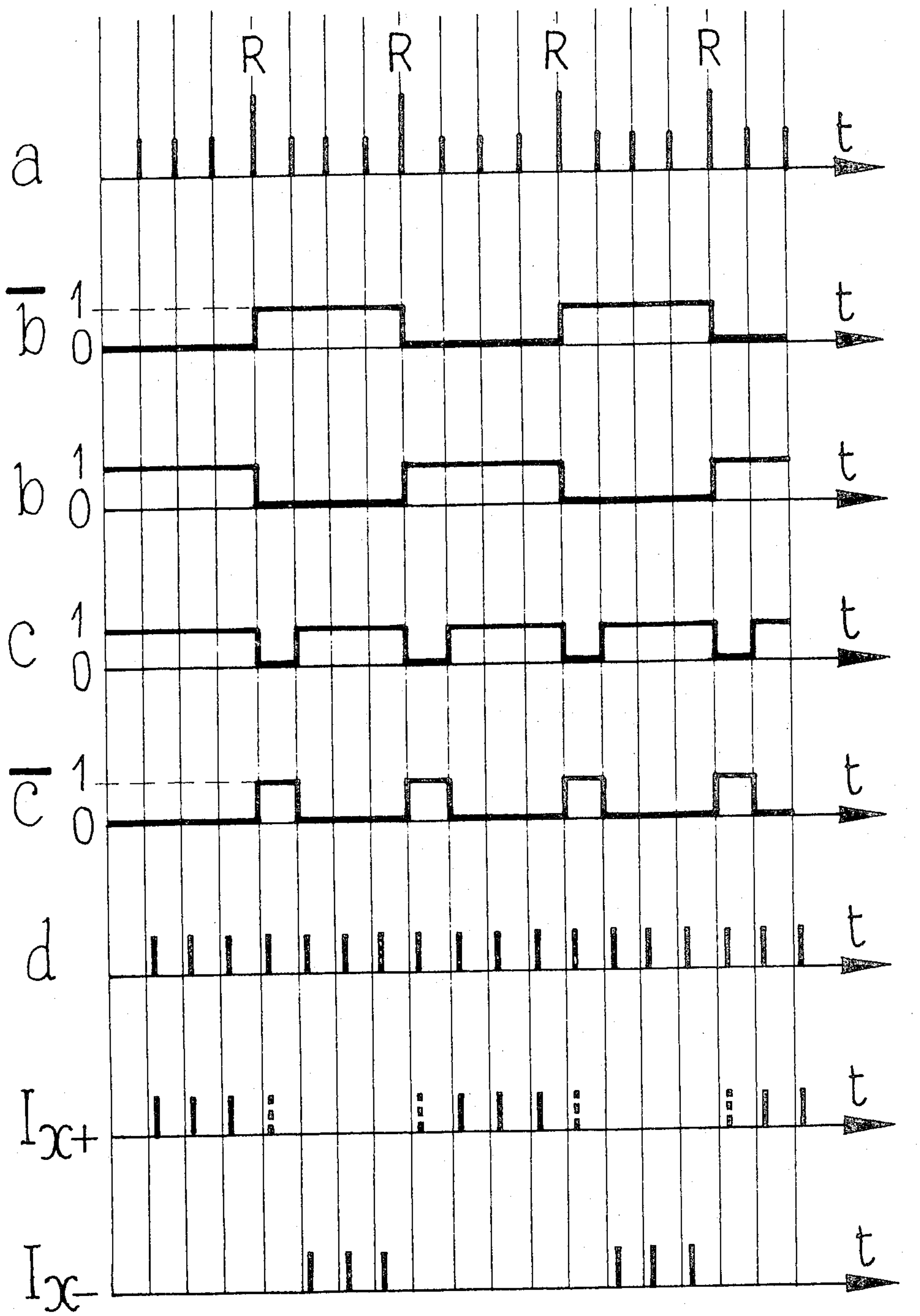
FIG. 10 illustrates the voltages at certain points in the device shown in FIG. 9.

An embodiment of this circuit is shown in FIG. 9;

FIG. 10 represents the shapes of the signals appearing at certain points in the circuit of FIG. 9.

The device shown in FIG. 9 thus essentially comprises the elements referred to hereinbefore, that is to say a clock 100 generating pulses of recurrence frequency $1/\Delta t$ (signals H in FIG. 10). This frequency is chosen as a funtion of the dimension of the elementary point, that is to say of the intensity of the beam and the sensitivity of the resin being printed. These pulses are applied to one input of an AND-gate 101.

The other input of this gate is connected to the output of a bistable trigger stage 103 with two states 1 and 0. This trigger stage is placed in the 1 state by an input $D_1$ linked with the computer and supplying the starting command. When it is in the 1 state, it opens the gate 101.

The trigger stage 103 is reset to the state 0 by the other input D2.

The output of the gate 101 is connected to the input of a controllable counter-divider 104 which produces a pulse when it has received 1 input pulses, that is to say at the end of each line, the output of this counter-divider being connected to another counter-divider 105 which produces a pulse when it has received h. The output of this counter is connected to the input D2 of the trigger stage 103 and the pulse which it supplies resets it to zero and closes the gate 101. The output of the counter 104 produces the pulses Iy which are applied to the input of the counter 20 in FIG. 7 (pulses corresponding to transit from one line to the next).

The output pulse from the counter 105 marks the end of the writing of the elementary image.

The numbers l and $h$ are applied by inputs whose 0 and 1 states are defined by a suitable output of the computer which thus decides the length l and the height $h$ of the figure to be traced.

The output of the counter 104 and the output of the gate 101 are respectively connected to two inputs of a bistable trigger stage 106. This trigger stage is placed in the zero state by the output pulse from 104 and reset to the 1 state by the next output pulses from 101. It has two complementary outputs marked c and c, one being in the 1 state whilst the other is in the 0 state, and vice versa.

The signals $c$ and $\bar{c}$ are represented in FIG. 10 by the curves C and $\bar{C}$.

The output of the counter 105 is connected to the two inputs of a bistable trigger stage 107. An end-ofline pulse R places it in the 1 state, and the next one in the 0 stage.

This latter trigger stage has two complementary outputs $b$ and $\bar{b}$. The output $b$ is therefore in the one state at the start and transfers to the zero stage with the first pulse R, to the 1 state with the next, and so on.

The outputs $b$ and $c$ are connected to two inputs of a first gate 108 whose output is connected to a first input of an OR gate 110.

The outputs $\bar{c}$ and $\bar{b}$ are connected to two inputs of a gate 109 whose output is connected to a first input of an OR-gate 111.

The gates 108 and 109 each have a last input connected directly to the clock through a delay circuit 117 and the AND gate 101. This delay circuit has the effect of delaying the clock pulses by a time equal to the response time of the various trigger stages.

The operation of this first part of the circuit is as follows:

First of all, as we have seen before, the beginning and end of an image sequence are controlled by the state of the trigger stage 103 which, in the 1 state opens the gate 101 so that the latter passes the clock pulses. These pulses, delayed slightly by the device 117, can be seen in the curve $d$, and are applied simultaneously to the corresponding inputs of the gates 108 and 109.

The gate 108 is open when the trigger stage 107 is in the 1 state (curve $b$), that is to say between the first and the second pulses R, in the case of the chosen example (four points per line and three lines for the elementary image).

The output $c$, which is normally in the 1 state but which changes to the 0 state between the first pulse R and the next clock pulses, closes the gate 108 during this time interval. The OR-gate 110 thus normally produces three first pulses at its output, that is to say three pulses $Ix_+$. On arrival of the first pulse R, the output b goes to the 0 state and the gate 108 closes.

At this instant, the output $\bar{b}$ changes to the 1 state and opens the gate 109. Following the same procedure, three pulses $Ix_-$ are supplied to the output of the OR-gate 111.

Thus, there are three pulses $Ix_+$, a dead time, three pulses $Ix_-$, a dead time, and so on and so forth. The sequences required to obtain the three elementary shapes are obtained and it can be seen that it is the production in one or the other, of these dead times, or the absence of the production of a pulse, which determines the shape factor.

In order therefore to produce one of these shape pulses or not to produce one at all, it is merely necessary either to supply or not to supply these pulses at the other input of the OR-gates 110 and 111.

This is done by the second part of the circuit shown in FIG. 9.

This comprises two-stages trigger whose stages 112 and 113 constitute the codes of the three shape factors. When the two trigger stages 113 and 112 are in the 0 state, they define the number 00, which signifies "rectangle."

When the trigger stage 112 is in the 1 state, the trigger stage 113 in the 0 state (number 10), the shape I is obtained; when the trigger stage 112 is in the 0 state and the trigger stage 113 in the 1 state (number 01), we have the shape II. The trigger commands are produced by an output C referred to as the computer code output.

The outputs of these trigger stages are connected to the first inputs, respectively of two AND-gates 115 and 116 whose other inputs are connected respectively to the delay circuit 117 and to the output $\bar{c}$. The latter is in the 1 state between each pulse R and the next clock pulse. The outputs of these gates are connected respectively to second inputs of the OR-gates 110 and 111. The result is the production of a pulse during one or the other of the dead times, depending upon the states of the code trigger stages 112 and 113, or the absence of such pulse production if these two trigger stages are in the 0 stage.

Thus, the anticipated result is achieved. It goes without saying that the circuit described is purely an example.

Moreover, the elementary figures are characterised essentially in that in order to transfer from one line to the next, in the case of the rectangle there is a dead time which is utilised to produce a shape pulse which makes it possible to produce one of the two figures other than the rectangle. This requires that the inclinations of the sides of the parallelograms to the axis of the $x$ coordinate, should be 45°, that is to say an angle having a tangent of 1. If other slopes were adopted, they would have to be arranged in order to give dead times equal to $2\,\Delta t$, $3\,\Delta t$, . . . so that the size of the parallelograms would make angles in relation to the $x$ axis, having tangents of 2, 3 . . . This could be done without departing from the scope of the invention.

The invention makes it possible to produce any desired figure by a process of line-by-line scanning, through the adoption of rectangles having heights equal to 1, that is to say comprising only one line of points.

To do this, it is merely necessary to set the number 1 in the divider 105.

Since the points have a diameter in the order of 0.1 microns in an electron microscope, it will readily be appreciated that it is possible to reproduce a considerable number of figures at a very small scale, for example printed characters. The invention thus makes it possible to automatically inscribe very small scale masks for subminiaturised electronic circuits. It also makes it possible to electrically display arbitrary figures by selective illumination of point light sources, using electrical addressing devices other than electron beams.

What we claim is:

1. A two dimensional pattern generator controlled by a computer and connected to a system having a first and a second piece for deflecting an addressing system respectively in two directions perpendicular to each other, for scanning a pattern line by line and each line point by point, by breaking up said pattern into elementary figures, of three well defined kinds, i.e. a rectangle having sides parallel respectively to two well defined references axes respectively perpendicular to each other, first and second parallelograms, having first sides parallel to one of said axes and second sides having a well defined slope and the opposite slope for said first and second parallelograms, respectively, said slope being equal to a number $n$, $n$ being an integer, comprising in combination: connected to one piece, first means for producing a first stair shaped voltage, having a programmed number of successive increasing steps of duration, corresponding to the length of each line and a predetermined difference of potential between two successive steps: a first input connected to said computer, for programming said number, a second input for programming said duration; a second means for producing a second stair shaped voltage for feeding to said second piece and having in alternation series of increasing and decreasing steps having a fixed duration which is a submultiple of said programmed duration, and corresponding to the distance between each successive points of each line, each series comprising the number of steps necessarily for scanning each point of each line; and each series comprising to the scanning of one line; an interval between each series; said interval having a fixed duration equal to that of *n* steps; a third input connected to said computer for inserting at will after each increasing series or each decreasing series, respectively *n* increasing steps or *n* decreasing steps.

2. A system as claimed in claim 1, wherein said addressing system is a particle beam, and said pieces are deflecting pieces for deflecting said particle beam.

3. A system as claimed in claim 2, wherein said particle beam is an electron beam.

4. A system as claimed in claim 1, wherein said interval between said series of steps has the duration of one step.

5. A system as claimed in claim 4, wherein said first and said second voltage generating means comprise a pulse generator, for generating pulses having a recurrence period equal to the duration of the second steps; a first counter having an input for receiving said pulses, and for counting pulses having recurrence period equal to the steps of said first shaped voltage; a first digital to analog converter having an input for receiving the count of said counter, and an output for delivering said first shaped voltage to said first piece; a second counter decounter device, having an upward input and a downward input for receiving in alternance series of pulses for increasing its count, and series for decreasing its count; a second analog to digital converter, connected to said second counter decounter device, for feeding to said second piece said second stair shaped voltage.

6. A system as claimed in claim 5, wherein said pulse generator comprises a clock, having one output, a first AND-gate having a first input connected to said clock output; a bistable trigger having an output for transmitting a pulse where switched from one state to the other, connected to said second input of said first AND-gate, and a first input connected to said computer and a second input; a first divider counter, having for its input said second input, a second divider counter connected in series with said first divider counter, between said first AND-gate output, and said second bistable trigger input, and having for its input said first input said first divider counter having an output connected to said first counter, said clock generating said pulses.

7. A system as claimed in claim 6, further comprising logic circuits, actuated by said first counter divider circuit for switching in alternance successive series of said pulses, to said downward input and to said upward input, each of said series comprising a number of pulses corresponding to said number of points in said lines, each said series of pulses being separated from the following one, by a time interval equal to recurrence period of said pulses; a bistable trigger, actuated by said third input for switching at will after each series fed to said inward or to said outward input, a further pulse from said pulse generator.

* * * * *